M. NELSON.
SEWER PIPE COUPLING AND CONNECTION.
APPLICATION FILED NOV. 14, 1908.

913,036.

Patented Feb. 23, 1909.

Inventor
Mads Nelson

Witnesses

UNITED STATES PATENT OFFICE.

MADS NELSON, OF CANTON, OHIO, ASSIGNOR OF ONE-HALF TO FREDERICK W. PEDERSEN, OF CANTON, OHIO.

SEWER-PIPE COUPLING AND CONNECTION.

No. 913,036.          Specification of Letters Patent.          Patented Feb. 23, 1909.

Application filed November 14, 1908. Serial No. 462,689.

*To all whom it may concern:*

Be it known that I, MADS NELSON, a citizen of the United States, residing at Canton, in the county of Stark and State of Ohio, have invented certain new and useful Improvements in Sewer-Pipe Couplings and Connections; and I do hereby declare that the following is a full, clear, and exact description of the same, reference being had to the accompanying drawing, making a part of this specification, and to the numerals of reference marked thereon, in which—

Figure 1:
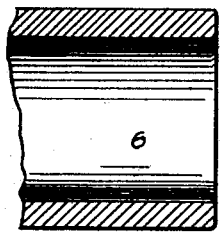
Figure 2:
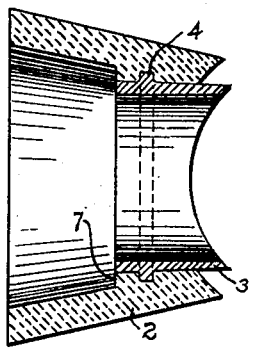
Figure 3:
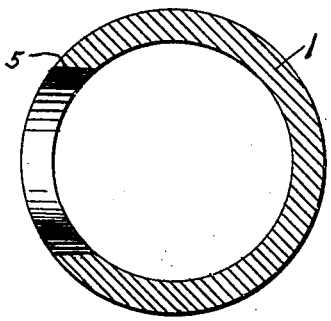
Figure 4:
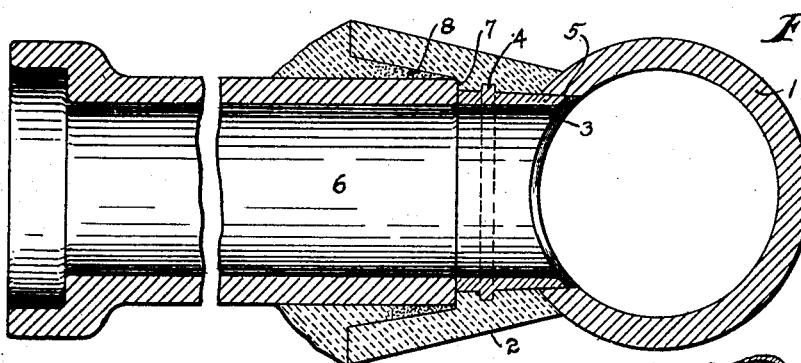
Figure 5:
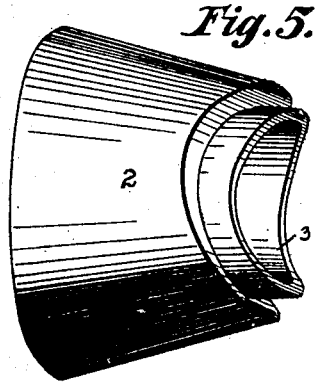
Figure 6:
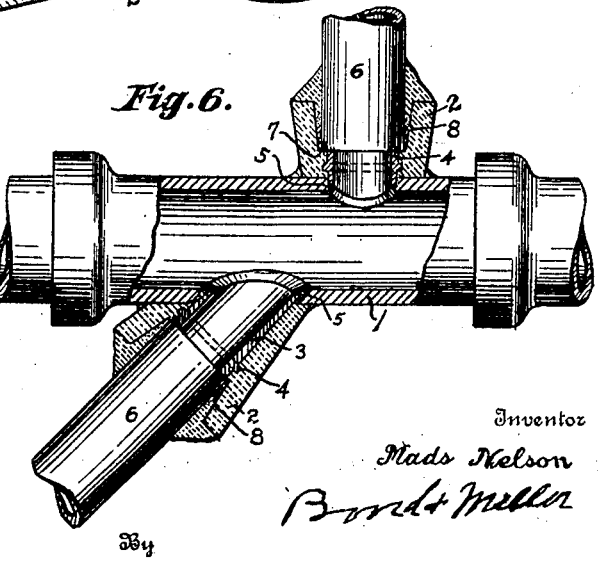

Figure 1 is a sectional view showing a portion of a lateral sewer pipe. Fig. 2 is a sectional view showing the coupler section and its different parts. Fig. 3 is a transverse section of a main sewer pipe. Fig. 4 is a longitudinal sectional view of the lateral sewer pipe coupler and a section of a lateral sewer pipe, said figure showing a transverse section of the main sewer pipe and illustrating the lateral pipe properly connected and coupled. Fig. 5 is a detached view of the lateral sewer pipe coupler. Fig. 6 is a view showing a portion of the main sewer pipe, said portion being shown partially in section and illustrating two lateral sewer pipes connected, one at right angles and another at an angle to a right angle to the main sewer pipe.

The present invention has relation to sewer pipe coupling and connection and it consists in the novel arrangement hereinafter described and particularly pointed out in the claim.

Similar numerals of reference indicate corresponding parts in all the figures of the drawing.

In the accompanying drawing, 1 represents the main sewer pipe, which is of the usual construction, except that the ordinary and common integral Y or lateral extensions are dispensed with. The body of the coupler 2 is formed of cement and is preferably of the form shown in the drawing; to this coupler is securely connected the metallic thimble 3, which thimble is provided with the annular rib 4, which rib is for the purpose of holding the thimble 3 against endwise movement with reference to the coupler 2. The rib 4 is extended beyond the outer surface of the thimble 3 and is so extended for the purpose of providing a projection to be seated in the cement coupler 2. It will be understood that in use the thimble 3 is connected to the coupler 2 while the cement is in a plastic state; but after the cement has become hardened the thimble 3 will be permanently connected to the coupler.

The thimble 3 is extended beyond the end of the coupler designed to abut against the main sewer pipe and is so extended for the purpose of being entered in the side opening 5 formed in the main sewer pipe 1, which opening is cut by suitable tools and of a size to correspond substantially with the size of the thimble, whereby the integral Y's or lateral extensions are dispensed with. The coupler is flared so as to provide a tapered entrance for the lateral sewer pipe 6 and for the purpose of providing a proper end abutment for the lateral sewer pipe 6, the coupler 2, is provided with the shoulder or flange 7 and the outer end of the thimble 3 located in a transverse plane with the shoulder or flange 7 whereby the connected end of the lateral pipe 6 is abutted against the flange or shoulder 7 and the thimble 3 as best illustrated in Fig. 4. In use the thimble 3 is extended beyond the coupler 2 a distance somewhat less than the thickness of the shell of the main sewer pipe 1, and is so formed for the purpose hereinafter described.

It is important in the connection of lateral pipes to the main sewer pipe that no leakage takes place at the joint and in order to better provide against this objection the thimble 3 should be and preferably is so formed that the end of the thimble will be located between the inner and outer surfaces of the main sewer pipe 1. By so locating the end of the thimble 3 a quantity of cement can be placed upon the end of the thimble 3 or in other words the end of the thimble leading into the main sewer pipe can be curved. This can be done after the coupler has been placed in position and before the lateral pipe has been connected by extending the hand into the main sewer pipe through the coupler proper and spreading or distributing the cement while in a plastic state. The lateral sewer pipe 6 is connected to the coupler 4 in the usual manner preferably by the use of oakum located as illustrated at 8, that is to say between the inner surface of the coupler 4 and the outer surface of the lateral pipe 6 and the oakum covered by cement. It will be understood that by the use of oakum it acts as a seal to the joint.

It will be understood that the connected end of the thimble 3 should be concaved and the abutting end of the coupler 4 also concaved to correspond with the curvature of the main sewer pipe 1, whereby a close joint is produced as between the coupler 4 and the main sewer pipe and the inner end of the thimble conforming substantially with the curvature of the inner surface of the main sewer pipe.

Having fully described my invention what I claim as new and desire to secure by Letters Patent, is—

In a sewer pipe coupling and connection the combination of a main sewer pipe, a lateral opening formed therein, a thimble adapted to be entered in the lateral opening of the main sewer pipe, said thimble provided with an annular flange upon its outer surface, a coupler secured to the thimble, said coupler provided with an annular shoulder and the outer end of the thimble located in the same transverse plane as that of the shoulder and a lateral pipe adapted to abut against the shoulder and the outer end of the thimble and means for connecting said lateral pipe to the thimble, substantially as and for the purpose specified.

In testimony that I claim the above, I have hereunto subscribed my name in the presence of two witnesses.

MADS NELSON.

Witnesses:
  F. W. BOND,
  NILES A. SPONSELLER.